(12) United States Patent
Bhatia et al.

(10) Patent No.: US 7,666,512 B2
(45) Date of Patent: Feb. 23, 2010

(54) THERMAL RESISTANT ENVIRONMENTAL BARRIER COATING

(75) Inventors: Tania Bhatia, Middletown, CT (US); Harry Eaton, Woodstock, CT (US); Ellen Y. Sun, South Windsor, CT (US); Thomas H. Lawton, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 195 days.

(21) Appl. No.: 10/915,158

(22) Filed: Aug. 9, 2004

(65) Prior Publication Data

US 2006/0029814 A1 Feb. 9, 2006

(51) Int. Cl.
*B32B 9/04* (2006.01)
*B63H 1/00* (2006.01)
*B05D 5/06* (2006.01)

(52) U.S. Cl. .............. 428/446; 416/241 R; 416/241 B; 427/162; 427/402

(58) Field of Classification Search ............ 428/446; 416/241 R, 241 B; 427/162, 402
See application file for complete search history.

(56) References Cited

U.S. PATENT DOCUMENTS

| 2,783,967 | A | * | 3/1957 | Scharf et. al. ........... 416/241 R |
| 5,869,146 | A | | 2/1999 | McCluskey et al. |
| 6,210,791 | B1 | | 4/2001 | Skoog et al. |
| 6,294,261 | B1 | * | 9/2001 | Sangeeta et al. ............ 428/469 |
| 6,387,526 | B1 | * | 5/2002 | Beele ........................ 428/469 |
| 6,558,814 | B2 | * | 5/2003 | Spitsberg et al. ........... 428/633 |
| 6,589,677 | B1 | | 7/2003 | Sun et al. |
| 6,617,036 | B2 | | 9/2003 | Eaton et al. |
| 6,663,983 | B1 | * | 12/2003 | Darolia et al. ............ 428/632 |
| 2002/0123561 | A1 | | 9/2002 | Rose et al. |
| 2005/0282020 | A1 | * | 12/2005 | Stowell et al. ............ 428/446 |

FOREIGN PATENT DOCUMENTS

| DE | 34 13 390 | 10/1985 |
| DE | 197 12 918 | 9/1998 |
| JP | 2000007472 | 1/2000 |

OTHER PUBLICATIONS

"Thermal Conductivity and Stability of HFNIA- and Zirconate Based Materials for Advanced 1650°C Thermal/Environmental Barrier Coating Applications", by Zhu et al., published Nov. 2003.
Database WPI Week 199736 Derwent Publications Ltd., London, GB; An 1997-389450 XP002423966 & JP 09 169849 (Mitsui Toatsu Chem. Inc.) Jun. 30, 1997.
Database WPI Week 199251 Derwent Publications Ltd., London, GB; An 1992-420844 XP002423967 & JP 04 317441 A (Nippon Sheet Glass Co. Ltd.) Nov. 9, 1992.
Japanese Office Action for JP 2005-195861, dated Jun. 17, 2008.

* cited by examiner

*Primary Examiner*—Timothy M Speer
*Assistant Examiner*—Gordon R Baldwin
(74) *Attorney, Agent, or Firm*—Bachman & LaPointe, P.C.

(57) ABSTRACT

A process for preparing a silicon based substrate with a protective coating having improved thermal resistance at temperature up to at least 1500° C., and the resulting article.

18 Claims, No Drawings

THERMAL RESISTANT ENVIRONMENTAL BARRIER COATING

U.S. GOVERNMENT RIGHTS

The invention was made with U.S. Government support under Contract NAS3-01138 awarded by NASA. The U.S. Government has certain rights in the invention.

BACKGROUND OF THE INVENTION

The present invention relates to a process for the deposition of protective coatings on Si-based substrates used in articles subjected to high temperature, aqueous environments, and the resulting article.

Ceramic materials containing silicon have been proposed for structures used in high temperature applications, for example, gas turbine engines, heat exchangers, internal combustion engines, and the like. A particular useful application for these materials is for use in gas turbine engines which operate high temperatures in aqueous environments. It has been found that these silicon containing substrates can recede and lose mass as a result of a formation volatile Si species, particularly $Si(OH)_x$ and SiO when exposed to high temperature, aqueous environments. For example, silicon carbide when exposed to a lean fuel environment of approximately 1 ATM pressure of water vapor at 1200° C. will exhibit weight loss and recession at a rate of approximately 6 mils per 1000 hrs. It is believed that the process involves oxidation of the silicon carbide to form silica on the surface of the silicon carbide followed by reaction of the silica with steam to form volatile species of silicon such as $Si(OH)_x$.

Suitable coatings for articles containing silicon based substrates which are employed in the environments claimed above are well known in the art. See for example U.S. Pat. Nos. 5,305,726; 5,869,146; 6,284,325; 6,296,941; 6,352,790; and 6,387,456. The environmental barrier coatings (EBCs) are generally based on a two or three layer design utilizing a bond coat, an optional intermediate layer, and an environmental protection layer. The bond coat may be, for example, a dense continuous layer of pure silicon or silicon with a modifier. The top protective layer may be an alkaline earth aluminosilicate based on barium and/or strontium or a simple silicate based system such as yttrium silicate either of which are chosen in part by matching the coefficient of thermal expansion (CTE) of the top layer to the under layer and/or substrate. Other top layer systems may also be used. An intermediate layer, if employed, may be for example, a mixture of the top layer with a second phase that in combination serves to provide a barrier action and/or to help modify the CTE of the system. Engine testing to date of EBC designs in combustor locations has shown significant benefit for industrial gas turbines use at temperatures of up to 1200° C. and for durations of more than 15,000 hrs.

Use of these EBC designs as described above, at advanced surface temperatures of up to 1500° C., especially under thermal gradient conditions, have been shown to suffer from changes in thermal resistance of the EBC coating. The change is due to at least three phenomenon. First, changes in microstructure of the EBC can result due to high temperature exposure. As-fabricated, thermal sprayed structures have a splat quenched, layered, non-equilibrium microstructure. On high temperature exposure the structure can equilibrate losing the splat-quenched microstructure. This loss alters the light scattering behavior of the structure and this in turn affects radiant energy transmission through the coating. Second, because of densification of the microstructure, the thermal conductivity of the coating increases. Third, at a higher temperature, the peak wavelength of emitted light radiation occurs at shorter wavelength. This phenomenon can result in effective reduction in thermal resistance of the EBC if the EBC is more transparent to radiant energy at shorter wavelength. Generally, these phenomena are observed at temperatures of 1200° C. to 1500° C. for laboratory time scales.

Naturally, it would be highly desirable to provide improved top layers for EBC's, which are thermally stable at temperatures up to at least 1500° C.

Accordingly, it is a principle object of the present invention to modify heretofore known top layers for EBC's so as to extend the useful life of the top layer in temperature environments of up to at least 1500° C.

It is a further object of the present invention to provide a top layer as aforesaid which includes additives which stabilize as fabricated properties and/or affect the mechanisms of thermal resistance based on transmission of radiant energy in connection with top layers.

SUMMARY OF THE INVENTION

The present invention relates to an article comprising a Si-based substrate having a protective coating with improved thermal resistance with respect to transmission of radiant energy at temperatures of up to at least 1500° C. and a process for coating a silicon-based substrate with the thermally stable protective layer. The article comprises a Si-based substrate and at least one protective layer on the substrate, the protective layer comprises an additive which either stabilizes the as-fabricated structure for high temperature use and/or alters the mechanism of thermal resistance of the protective layer. In accordance with the present invention, the additive effectively maintains the scattering centers to inhibit transmitted radiant energy and/or exhibits a high emittance in the 0.7 to 5 micron wavelength region of the electromagnetic spectrum. The additive is selected from the group consisting of color centers, scattering centers, porous pyrochlore structures ($A_2B_2O_7$ ordered where A is one or more rare earth elements and B is one or more of Zr, Hf and Ti or defect fluorite structures, that is, any rare earth oxide dissolved in Zr, Hf and Ti), sacrificial pore formers, and mixtures thereof. The process of the present invention comprises the steps of providing a Si-based substrate and depositing a protective coating having an additive(s) which alters the mechanism of thermal resistance of the protective coating. In a preferred embodiment, the protective coating comprises an EBC doped with the additive. Alternatively, a top coat is provided which comprises at least the additive. The process provides an article characterized by a thermal stability at temperatures up to at least 1500° C.

It has been found that environmental barrier coatings (EBC) based on alkaline earth aluminosilicates as the protective top layers have exhibited reduced performance at temperatures of up to at least 1500° C. It has been observed that these protective top layers lose their original white, opaque appearance at these elevated temperatures and change toward a colorless, semi-transparent, translucent surface. Subsequent failure of the Si-based substrate during gradient thermal testing due to an over temperature condition of the substrate has been attributed to the decreased thermal resistance of the EBC layer as a result of the foregoing change in visual appearance. It has been found that the change of appearance results in an increased radiative transmission of heat energy through the EBC as the original microstructure of the EBC is altered and the EBC becomes more translucent to the radiative heat energy.

It has been found in accordance with the present invention that the protective coating and/or top layer is able to have its use for life extended by altering the mechanism of thermal resistance of the EBC and/or top layer. In accordance with the present invention, the mechanism of thermal resistance of the EBC and/or top layer is altered and the use for life of the EBC is extended by providing an additive in the EBC and/or in or as a top coat which inhibits transmission of radiant energy in the wavelength region between 0.7 to 5 microns.

DETAILED DESCRIPTION

Doping the EBC and/or adding a top layer to the EBC with cations having or forming incomplete d-shell electron configurations, or to a lesser extent incomplete F-shell configurations, can lead to very strong color centers affecting transmission of heat energy in the desired micron wavelength region of the electromagnetic spectrum. General candidates for surface layers and/or additives are spinels and structures based on spinels including the transition metal aluminates, manganates, ferrites, chromates, cobaltates, silicates, and aluminosilicates. More specifically, additives such as chromium oxide, iron oxide, nickel oxide, cobalt oxide, manganese oxide, and aluminates, manganates, ferrites, chromates, cobaltates of these and their mixtures are added to existing EBC systems or included in or as top layers to produce the needed color centers. Additives such as $Cr_2O_3$, CoO, $Fe_2O_3$, NiO, MnO, $CoAl_2O_4$, $NiAl_2O_4$, $CoCr_2O_4$ are particularly useful.

In accordance with a further embodiment of the present invention, it is desirable to use porous pyrochlore structures ($A_2B_2O_7$ ordered, or defect fluorite structures as described above) as additives to or as potential top layer compositions because they retain microstructure at high temperatures up to at least 1500° C. because they resist sintering. These include zirconates, titanates, hafnates, of rare earths such as Y, Gd, Nd, Ho, Er, Pr, Pm, Sm, and Eu and other ordered compounds which are sinter resistant due to increased diffusional distances within their structures.

In a still further embodiment, a top layer of a sacrificial pore former composed of a high vapor pressure phase comprises for example free silica within a low vapor pressure phase matrix comprising for example free alumina, zirconia, hafnia, titania or mullite will lead to a continuously forming scattering center system. This may be represented by a system such as mullite with free silica or simply mullite alone in a steam environment in which the silica is volatized out of the structure leaving behind porous alumina. Another example of this type of system may be niobium oxide or tantalum oxide in a steam-stable transition metal oxide (such as oxides of hafnium, titanium or zirconium or mixtures thereof).

When applied as a top coat, thickness in the range of 0.005" to 0.020" placed on the surface of the EEC can serve to increase the emittance of the EBC system thereby reducing or eliminating radiative heat transfer through the EBC system. Alternatively, doping the existing EEC protective layer with up to 25% by vol., preferably between 5% to 20% by vol., of the abovementioned additives produce the desired effect.

If the additive of the present invention as provided in a top coat, the top coat may be applied to the EBC in any manner known in the art including, but not limited to thermal spraying, chemical vapor deposition, physical vapor deposition, slurry based routes, dipping, painting, melt coat, etc. If an EBC layer is to be doped with the additive of the present invention, a process for doping is again well known in the art and includes for example alloying and mechanical mixing followed by thermal spraying or other coating processing mentioned above.

It has been found in accordance with the present invention that the additive of the present invention extends the life of protective coatings heretofore employed on Si-based substrates in high temperature, aqueous environments and, particularly, in the temperature range up to at least 1500° C.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An article comprising a silicon containing substrate and an environmental barrier coating protective layer disposed thereon for inhibiting transmission of radiant energy, the protective coating comprises at least a top layer, wherein the environmental barrier coating protective layer is doped with an additive present in an amount of 5% to 25% by volume of said environmental barrier coating protective layer which inhibits transmission of radiant energy in the wavelength region of the electromagnetic spectrum of between 0.7 to 5.0 microns, wherein the additive comprises a color center selected from the group consisting of spinels, transition metal aluminates, manganates, ferrites, chromates, cobaltates, oxides of chromium, iron, nickel, cobalt, manganese, and mixtures thereof.

2. An article according to claim 1, wherein the additive is selected from the group consisting of $Cr_2O_3$, CoO, $Fe_2O_3$, NiO, MnO, $CoAl_2O_4$, $NiAl_2O_4$, $CoCr_2O_4$ and mixtures thereof.

3. The article of claim 1, further comprising a top layer disposed upon said environmental barrier coating protective layer.

4. A process for the deposition of a protective coating on a Si-based substrate, comprising the steps of:
   providing a Si-containing substrate; and
   depositing an environmental barrier coating on the substrate,
   wherein the environmental barrier coating is doped with an additive present in an amount of 5% to 25% by volume of the environmental barrier coating which inhibits the transmission of radiant energy in the wavelength region of the electromagnetic spectrum of 0.7-5 microns, wherein the additive comprises a color center selected from the group consisting of spinels, transition metal aluminates, manganates, ferrites, chromates, cobaltates, oxides of chromium, iron, nickel, cobalt, manganese, and mixtures thereof.

5. The process of claim 4, further comprising depositing a top layer upon said environmental barrier coating.

6. An article comprising a silicon containing substrate and an environmental barrier coating protective layer disposed thereon for inhibiting transmission of radiant energy, the environmental barrier coating protective layer is doped with an additive present in amount of 5% to 25% by volume of said environmental barrier coating protective layer which inhibits transmission of radiant energy in the wavelength region of the electromagnetic spectrum of between 0.7 to 5.0 microns, wherein the additive comprises a porous pyrochlore structure selected from the group consisting of rare earth zirconates, titantates, hafnates and mixtures thereof having a general formula $A_2B_2O_7$ where A is at least one rare earth element and B is at least one of Zr, Hf and Ti, said porous pyrochlore structure imparts a porosity to said environmental barrier coating protective layer.

7. The article of claim 6, further comprising a top layer disposed upon said environmental barrier coating protective layer.

8. An article comprising a silicon containing substrate and an environmental barrier coating protective layer disposed thereon for inhibiting transmission of radiant energy, the protective coating comprises at least a top layer, wherein the environmental barrier coating protective layer disposed thereon is doped with an additive present in an amount of 5% to 25% by volume of said environmental barrier coating protective layer which inhibits transmission of radiant energy in the wavelength region of the electromagnetic spectrum of between 0.7 to 5.0 microns, wherein the additive comprises a sacrificial pore former comprising a high vapor pressure phase within a lower vapor pressure phase matrix with respect to an air and/or steam environment which results in the continuous formation of scattering centers at temperatures up to at least 1,500° C., said sacrificial pore former imparts a porosity to said environmental barrier coating protective layer.

9. An article according to claim 8, wherein the sacrificial pore former comprises silica in a matrix containing at least one of: $ZrO_2$, $Al_2O_3$, $HfO_2$, $TiO_2$, and rare earth oxides.

10. An article according to claim 8, wherein the sacrificial pore former is selected from the group consisting of mullite, silica, $Ta_2O_5$, $Nb_2O_5$, complex silicates and mixtures thereof.

11. An article according to claim 8, wherein the additive is present in an amount between 5% to 20% by vol.

12. The article of claim 8, further comprising a top layer disposed upon said environmental barrier coating protective layer.

13. A process for the deposition of a protective coating on a Si-based substrate, comprising the steps of:
providing a Si-containing substrate; and
depositing an environmental barrier coating on the substrate,
wherein the environmental barrier is doped with an additive present in an amount of 5% to 25% by volume of the environmental barrier coating which inhibits the transmission of radiant energy in the wavelength region of the electromagnetic spectrum of 0.7-5 microns, wherein the porous pyrochlores is selected from the group consisting of rare earth zirconates, titantates, hafnates and mixtures thereof having the general formula $A_2B_2O_7$ where A is at least one rare earth element and B is at least one of Zr, Hf and Ti, said porous pyrochlores impart a porosity to said environmental barrier coating.

14. The process of claim 13, further comprising depositing a top layer upon said environmental barrier coating.

15. A process for the deposition of a protective coating on a Si-based substrate, comprising the steps of:
providing a Si-containing substrate; and
depositing an environmental barrier coating on the substrate,
wherein the environmental barrier coating is doped with an additive present in an amount of 5% to 25% by volume of the environmental barrier coating which inhibits the transmission of radiant energy in the wavelength region of the electromagnetic spectrum of 0.7-5 microns, wherein the additive comprises a sacrificial pore former comprising a high vapor phase within a lower vapor phase matrix which results in the continuous formation of scattering centers at temperatures up to at least 1,500° C., said sacrificial pore former imparts a porosity to said environmental barrier coating.

16. A process according to claim 15, wherein the sacrificial pore former comprises silica in a matrix containing at least one of: $ZrO_2$, $Al_2O_3$, $HfO_2$, $TiO_2$, and rare earth oxides.

17. A process according to claim 15, wherein the sacrificial pore former is selected from the group consisting of mullite, silica, complex silicates, $Ta_2O_5$, $Nb_2O_5$ and mixtures thereof.

18. The process of claim 15, further comprising depositing a top layer upon said environmental barrier coating.

* * * * *

UNITED STATES PATENT AND TRADEMARK OFFICE
CERTIFICATE OF CORRECTION

PATENT NO.      : 7,666,512 B2                              Page 1 of 1
APPLICATION NO. : 10/915158
DATED           : February 23, 2010
INVENTOR(S)     : Bhatia et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 440 days.

Signed and Sealed this

Fourth Day of January, 2011

David J. Kappos
*Director of the United States Patent and Trademark Office*